United States Patent
Lambricht et al.

(10) Patent No.: US 10,370,288 B2
(45) Date of Patent: Aug. 6, 2019

(54) GLASS SHEET CAPABLE OF HAVING CONTROLLED WARPING THROUGH CHEMICAL STRENGTHENING

(71) Applicant: AGC GLASS EUROPE, Louvain-la-Neuve (BE)

(72) Inventors: Thomas Lambricht, Perwez (BE); Aline Degand, Bleret (BE); Audrey Dogimont, Sart-Dames-Avelines (BE); Florence Scheyvaerts, Brussels (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 15/565,757

(22) PCT Filed: Apr. 25, 2016

(86) PCT No.: PCT/EP2016/059133
§ 371 (c)(1),
(2) Date: Oct. 11, 2017

(87) PCT Pub. No.: WO2016/177592
PCT Pub. Date: Nov. 10, 2016

(65) Prior Publication Data
US 2018/0118609 A1    May 3, 2018

(30) Foreign Application Priority Data
May 5, 2015 (EP) .................................... 15166429

(51) Int. Cl.
| C03C 3/087 | (2006.01) |
|---|---|
| C03C 21/00 | (2006.01) |
| C03C 3/085 | (2006.01) |
| C03C 23/00 | (2006.01) |
| C03C 4/18 | (2006.01) |

(52) U.S. Cl.
CPC .............. *C03C 3/087* (2013.01); *C03C 3/085* (2013.01); *C03C 4/18* (2013.01); *C03C 21/002* (2013.01); *C03C 23/008* (2013.01); *C03C 2204/00* (2013.01)

(58) Field of Classification Search
CPC ......... C03C 3/087; C03C 3/085; C03C 21/00; C03C 21/002
See application file for complete search history.

(56) References Cited

U.S. PATENT DOCUMENTS

| 6,518,211 B1 | 2/2003 | Bradshaw et al. |
|---|---|---|
| 2013/0203584 A1 | 8/2013 | Arai et al. |
| 2013/0224491 A1 | 8/2013 | Smedskjaer et al. |
| 2014/0329661 A1 | 11/2014 | Arai et al. |
| 2015/0072129 A1 | 3/2015 | Okahata et al. |
| 2016/0023945 A1 | 1/2016 | Suzuki et al. |
| 2016/0083288 A1 | 3/2016 | Kase et al. |

FOREIGN PATENT DOCUMENTS

| WO | WO-2013047806 A1 * | 4/2013 | ............. C03C 3/087 |
|---|---|---|---|
| WO | WO-2013146438 A1 * | 10/2013 | ............. C03C 15/00 |
| WO | 2014/104302 A1 | 7/2014 | |
| WO | 2014/196407 A1 | 12/2014 | |

OTHER PUBLICATIONS

International Search Report dated Jul. 12, 2016 in PCT/EP2016/059133 Filed Apr. 25, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The invention relates to a float glass sheet having a boron- and lithium-free glass composition comprising the following in weight percentage, expressed with respect to the total weight of glass: 65≤$SiO_2$≤78% 5≤$Na_2O$≤20% 0≤$K_2O$<5% 1≤$Al_2O_3$<6% 0≤CaO<4.5% 4≤MgO≤12% a (MgO/(MgO+CaO)) ratio≥0.5 characterized in that the glass sheet has: (I). The invention corresponds to an easy chemically-temperable soda-silica type glass composition, which is more suited for mass production than aluminosilicate glass, and therefore is available at low cost, and with a base glass/matrix composition that is close to or very similar to compositions already used in existing mass production, and finally which shows reduced or controlled increased warping effect.

20 Claims, 1 Drawing Sheet

Figure 1:
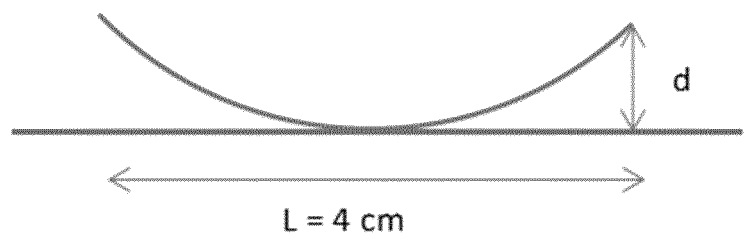

GLASS SHEET CAPABLE OF HAVING CONTROLLED WARPING THROUGH CHEMICAL STRENGTHENING

1. FIELD OF THE INVENTION

The present invention relates to an improved glass sheet which is able to be chemically tempered/strengthened and capable of having controlled warping through chemical strengthening. For example, the present invention relates to a glass sheet capable of being inhibited from warping through chemical strengthening to keep its flatness, or alternatively, capable of being warped through chemical strengthening to a desired shape.

In particular, the present invention relates to an improved glass sheet which is able to be easily chemically tempered/strengthened, capable of having controlled warping through chemical strengthening, and which is inexpensive and easy to produce.

Chemically strengthened glass sheets are finding increasing applications in specialized glazing jobs where a mechanical resistance is required/mandatory, in a monolithic or laminated form, like transportation (i.e. aeronautical, automotive), building/architecture and display industries. Amongst such applications, the display industry has become in the several past years a huge market on demand for chemically strengthened transparent glass sheets as protective/cover glass, viewing window or (touch)screen for numerous electronic devices like mobile phones, smartphones, TV, computers, digital cameras, etc. Indeed, as many of these devices are portable, the glass used is mechanically solicited a lot and it is therefore highly desirable that it is able to tolerate impact and/or damage, such as scratches or impact, during use and transport. Chemical strengthening is even more of great importance in the domain of displays because such a domain requires glass sheets of low thickness (as low as less than 1 mm) and because chemical strengthening is known as the process of choice to mechanically reinforce (ultra-)thin glass sheets. For weight reasons, it is also advantageous to use thin glass sheets as cover glass for solar, thermal or photovoltaic device.

2. SOLUTIONS OF THE PRIOR ART

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. The rupture strength of a glass article which has been so treated is thus increased by a value approximately equal to the surface compressive stress generated.

Nevertheless, a damage capable of affecting the surface of a chemically strengthened glass during its use leads to a decrease in this strengthening effect and can even annihilate it if the damage is such that the layer under compression is penetrated. In consequence, depending on the use intended for the chemically strengthened glass, focus is made on achieving a high value of surface compressive stress (or "CS") and/or a high value of thickness of the layer under compression (which is associated with the parameter called the "depth of layer" or "DoL", namely the depth reached by the ions introduced) which is ideally at least equal to the depth of the largest possible defect/damage that the glass may undergo. The combination of these two parameters are generally considered to define appropriately the quality of the resulting mechanical strength.

In particular, in the display domain, when using a "piece-by-piece process" to produce chemically strengthened glass sheets (cutting to final size is carried out before tempering treatment), a high value of DoL (preferably higher than 10 microns and very preferably higher than 12 microns or even better higher than 15 microns) is searched for edge strength, while when using a "sheet process" (cutting to final size is carried out after tempering treatment), "central tension" (defined as (CS*DoL)/(glass thickness−2*DoL)) must be kept low.

It is also known that the two strengthening parameters also depend significantly, for a given glass composition, on the conditions of temperature and time of the ion exchange process. Thus, the thickness of the layer under compression increases with the temperature and with the duration of the ion-exchange according to the known diffusion laws. But the higher the temperature, the more rapidly the stresses induced by the ion exchange relax. Likewise, extending the treatment for a too long period allows giving the stresses the necessary time to relax and thus results in a less degree of toughening. The conditions to be chosen for the process therefore reside generally in a compromise between the optimum temperature and the minimum duration, to optimize process cost.

To lower the cost of the chemical strengthening (limiting duration and/or temperature to reach searched values of compressive stress and DOL), a lot of glass compositions which are "easy chemically temperable" (meaning that they especially favour ion exchange) have been proposed (merely described or already on the market) but they generally have various drawbacks.

Many of them comprise ingredients originating from expensive raw materials and/or considerably modifying the physical properties of the glass (molten or final). Some of the chemically temperable glass compositions known contain, for example, significant contents of lithium and/or boron. However, lithium has the disadvantage of increasing the density of the glass while boron has the disadvantage to cause sometimes formation of ream by its evaporation and furnace wall/refractories corrosion. Moreover, both have the additional and significant drawback to greatly increase final glass price, due to high price of their corresponding raw materials.

Aluminosilicate-type glass compositions, such as for example those described in US Patent Application US2012/0196110 A1, the GORILLA® glass product from Corning or the DragonTrail® glass product from Asahi Glass Co., are also known to be very efficient for chemical tempering. However, they have a lot of drawbacks. Their high temperature properties make them very difficult to produce (viscosity, fining ability, forming, refractories corrosion). Their cost is relatively high due to expensiveness of some raw materials to use (i.e. alumina) and due to the high temperatures required for their production (high content of energy/fuel).

Contrary to aluminosilicate glass compositions, soda-lime-silica glass compositions are generally not considered as good candidates for easy chemically temperable compositions, even if they are by far less expensive.

Finally, it is known that it is quite difficult to modify, even slightly, a glass composition, because:

a glass production line, and in particular a float line, represents considerable investment and it is not easily repairable if the composition causes, for example, damages to the refractories; and the transition time while changing from a composition to another is one parameter which is of high importance when producing glass, because if long, the production cost of the final glass is drastically negatively impacted.

Accordingly, there is a demand of the market in the display domain in particular for a chemically-temperable soda-lime-silica-type glass composition, which is more suited for mass production than aluminosilicate glass, and therefore is available at low cost, and with a base glass/matrix composition that is close to or very similar to compositions already used in existing mass production.

Next to that, float glass is widely used in general (and increasingly used in display industry) because of excellence in many respects such as flatness, smoothness and optical quality of surfaces and uniformity of thickness, and also its relatively low cost of production in comparison to glass sheets manufactured by other processes like, for example drawn glass.

Unfortunately, when using float glass sheets with small thicknesses, as required by the display/electronic market, and applying a chemical strengthening by a classical ion-exchange process, a problem called "warping" of the strengthened final glass sheet occurs. This warping causes the glass sheet to deform or deviate from flatness and, in particular, warp is evaluated on the glass sheet after chemical strengthening as the ratio d/L, where d equals the distance or depth of variation, and L equals the distance or length over which the variation occurs, as illustrated in FIG. 1. For example, in the case of a float glass sheet of about 0.7 mm in thickness and a L length of 4 cm, the warping of the strengthened glass sheet reaches ~0.04% so that flatness is seriously compromised. However, in particular in the display domain, such a flatness is highly desirable for many reasons like, for example, to improve optical quality of glass sheets, to allow fitting to a display device assembly, to avoid/minimize optical distortion, or also to allow uniformly and effective depositing of a coating on the glass sheet (i.e. TCO coatings).

The main reason of warping of float glass during chemical strengthening comes from asymmetric faces of float glass from a chemical point of view and their different behaviour regarding ion-exchange. Indeed, float glass comprises a so-called "tin face" resulting from the diffusion of tin from the float bath into the lower glass face (in contact with the molten tin). The tin face of a float glass sheet is classically enriched in tin in the bulk of the glass near the extreme surface, according to a specific profile (i.e. diffusion profile or with a "hump") generally extending over a few microns. Commonly, the face opposite to the tin face is called the "air face". It has been recognized previously that the tin in the lower face of float glass exerts a blocking influence on the diffusion of ions (i.e. potassium ions) into the lower face of the float glass. Next to that, another difference between both faces of float glass is their availability in sodium ions. Sodium is the species that will be exchanged with potassium during chemical tempering. If there is different sodium availability between each face of float glass, the exchange rate will not be the same for each face. Usually, a chemically strengthened float glass sheet thus warps such that the upper surface (air face, opposite to the tin face) becomes convex.

The warpage of a float glass becomes large with an increase in the degree of behavior of chemical strengthening. Accordingly, in a chemically strengthened float glass having surface compressive stress of 600 MPa or more and a depth of a compressive stress layer (DOL) of 15 μm or more, which has been developed to respond to the requirement of high scratch resistance, the problem of warpage becomes obvious compared to a chemically strengthened float glass of the related art having surface compressive stress (CS) of about 500 MPa and a depth of a compressive stress layer (DOL) of about 10 μm.

Although it is also a clear market demand to use float (ultra-)thin glass sheets in the display domain, there are presently only a few proposed solutions allowing to avoid at least partially warping phenomenon in thin float glass, and these proposed solutions have huge drawbacks which limit their advantageous implementation at an industrial scale. One of the known and classical method/pre-treatment to avoid warping is to physically grind and then polish the lower face of float glass in order to eliminate the tin layer before implementing ion-exchange treatment. For example, such a pre-treatment is shown in Japanese patent application primary publication No. 58-115043 (1983). Anyway, main existing solutions to warping of thin float glass sheets involve:

a significant additional cost for the produced glass, and/or
an off-line treatment, and/or
a higher probability of defects and/or glass breakage, thereby resulting in a lower production yield (worsening glass final cost), and/or
a loss of the excellent surface created on the surface of the molten tin bath.

In conclusion, there is a demand of the market in the display domain in particular for a chemically-temperable soda-lime-silica-type glass composition:

which is more suited for mass production than aluminosilicate glass, and therefore available at low cost,
with a base glass/matrix composition that is close to or very similar to compositions already used in existing mass production, and
with reduced or even no warping effect after toughening, while avoiding any additional off-line treatment like polishing or grinding treatment and thereby keeping excellent surface created on the surface of the molten tin bath.

3. OBJECTIVES OF THE INVENTION

The objective of the invention in particular is to remedy the cited disadvantages and resolving the technical problem, i.e. to provide a glass composition which is easy chemically temperable or, in other words, more favourable to ion exchange than conventional soda-lime-silica glass compositions, and which shows after toughening reduced warping (to keep flatness), or alternatively controlled increased warping (to a desired shape).

Another objective of the invention in at least one of its embodiments is to provide a glass composition which is easy chemically temperable and which allows reaching strengthening parameters appropriate for a "piece-by-piece" process used to produce cover glass for display devices (edge strength obtained typically by DoL>10-15 microns). In particular, an objective of the invention in such a context is to provide a glass composition which is easy chemically temperable and which allows obtaining great exchange depth, while keeping compressive stress values that result in a better reinforcement of glass.

Another objective of the invention in at least one of its embodiments is to provide a glass composition which is easy chemically temperable and easy to produce, in particular on an existing line of production of classical soda-lime-silica glass. In particular, an objective of the invention in such a context is to provide a glass composition which is easy chemically temperable and which does not require long transition time when passing from the production of the classical soda-lime-silica composition to the temperable composition (and vice-versa). Still in such a context, an objective of the invention is to provide a glass composition which is easy chemically temperable and which does not require to use raw materials, techniques and/or industrial installations which are different from those employed for classical soda-lime-silica glass ordinary produced (or, in other words, compatible with classical float process). More particularly, an objective of the invention in at least one of its embodiments is to provide a glass composition which is easy chemically temperable and with targeted properties (lower viscosity, lower working point temperature, melting point<1550-1500° C., sulfates fining ability, low refractories corrosion, appropriate devitrification temperature), thereby avoiding known drawbacks of alumino-silicate composition and making composition compatible with existing tools for production of soda-lime glass.

Finally, another objective of the invention is to provide a solution to the disadvantages to the prior art that is simple, quick and, above all, economical.

4. OUTLINE OF THE INVENTION

The invention relates to a float glass sheet having a boron- and lithium-free glass composition comprising the following in weight percentage, expressed with respect to the total weight of glass:

65≤$SiO_2$≤78%
5≤$Na_2O$≤20%
0≤$K_2O$<5%
1≤$Al_2O_3$<6%
0≤CaO<4.5%
4≤MgO≤12%;
(MgO/(MgO+CaO)) ratio≥0.5,
the glass sheet having:

$$0.01 < \left|\frac{(Na_2O)_{air}}{(Na_2O)_{tin}} - 1.03\right| \le 3$$

Hence, the invention rests on a novel and inventive approach, since it enables a solution to be found for the disadvantages of prior art.

The inventors have indeed found that it is possible to obtain an easy chemically temperable glass sheet which is unexpensive and easy to mass produce by combining in a soda-silica glass matrix, a low alumina and CaO content (compared to classical alumina-silicate glass) as well as a (MgO/(MgO+CaO)) ratio which is higher than 0.5 in comparison with classical soda-lime-silica glass compositions (with typical values for that ratio below 0.5). Moreover, while combining such a base glass matrix with a specific ratio between $Na_2O$ amount in the air face and in the tin face, one can reach an easy chemically temperable glass sheet capable of having controlled warping through chemical strengthening (reduced warping to keep flatness or, alternatively, controlled increased warping to get a desired shape).

Throughout the present text, when a range is indicated, the extremities are included. In addition, all the integral and subdomain values in the numerical range are expressly included as if explicitly written. Also throughout the present text, the values of content as percentages are values by weight (also mentioned as wt %), expressed with respect to the total weight of the glass. Moreover, when a glass composition is given, this relates to the bulk composition of the glass, except if explicitly described in another way.

Other features and advantages of the invention will be made clearer from reading the following description of preferred embodiments given by way of simple illustrative and non-restrictive examples.

The glass sheet of the invention is made of a soda-silica glass composition/matrix, comprising $SiO_2$ and $Na_2O$ as the main components and further comprising MgO, $Al_2O_3$, etc and optionally CaO, $K_2O$ etc.

The glass sheet of the invention is able to be chemically tempered or, in other words, ion-exchangeable/able to undergo an ion-exchange, with reduced or even no warping effect or alternatively, with increased warping to design a shape.

The glass sheet of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns. In many cases and as illustration, this content lies between 1 and 5 wt %, integrated over the first 10 microns starting from the surface.

The float glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The thickness of the float glass sheet is not particularly limited. In order to effectively perform chemical strengthening treatment described below, the thickness of the glass sheet is usually preferably 5 mm or less, more preferably 3 mm or less, more preferably 1.5 mm or less, and particularly preferably 0.8 mm or less (for example, less than 0.7 mm or less than 0.55 mm or even less than 0.35 mm). The problem of warpage after chemical strengthening is likely to occur when the thickness of the glass sheet is less than 3 mm, and typically, less than 1.5 mm.

According to the present invention, the float glass sheet has:

$$0.01 < \left|\frac{(Na_2O)_{air}}{(Na_2O)_{tin}} - 1.03\right| \le 3$$

The value of 1.03 subtracted from the ratio $$\frac{(Na_2O)_{air}}{(Na_2O)_{tin}}$$

allows eliminating contribution from reference (glass sheet not treated for warpage control). The defined term in absolute value allows covering both decrease of warpage or controlled increase of warpage.

To obtain the specific Na$_2$O ratio between air and tin faces in the glass sheet of the invention, a dealkalization treatment is implemented, and the difference between the degree of dealkalization between that in one face thereof and that in the other face thereof is set to be within a specific range. As a result, it is possible to control the exchange rate of ions in a face versus the opposite one, and it is possible to achieve a balance in the degree of behaviour of chemical strengthening between one face and the other one. For this reason, in the glass sheet of the invention, it is possible to control the warpage (reduce/avoid the warpage or alternatively increase the warpage) of the strengthened glass sheet, without conducting grinding or polishing treatment before strengthening.

The amount of Na$_2$O in the air face, namely "(Na$_2$O)$_{air}$", means the Na$_2$O amount in the bulk of the glass near the extreme surface of the air face. The amount of Na$_2$O in the tin face, namely "(Na$_2$O)$_{tin}$", means the Na$_2$O amount in the bulk of the glass near the extreme surface of the tin face. According to the invention, the Na$_2$O amount on each face (tin or air) is measured by an X-ray fluorescence (XRF) spectrometer using Na-Kα rays. In present text, the amount of Na$_2$O was determined by using a calibration curve method build with International glass reference samples. As the measurement apparatus, S4 Explorer manufactured by Bruker is exemplified with following measurement parameters:

Output: Rh 30 kV-100 mA
Filter: No
Mask: 34 mm
Colimator: 0.46
Analyzing crystal: XS55
Detector: FC
Element Rays: Na-Kα
Peak angle (2θ/deg.): 25,017
Peak measurement time period (seconds): 30
B. G. 1 (2θ/deg.): NA
B. G. 1 measurement time period (seconds): 0
B. G. 2 (2θ/deg.): NA
B. G. 2 measurement time period (seconds): 0
PHA FC: 37-174.

If the float glass sheet according to the invention is covered by a coating or a layer, the amount of Na$_2$O is determined while excluding the coating/layer itself, taking into account the glass only.

Preferably, the float glass sheet has:

$$0.03 < \left| \frac{(Na_2O)_{air}}{(Na_2O)_{tin}} - 1.03 \right| \leq 1.5$$

More preferably, the float glass sheet has:

$$0.05 < \left| \frac{(Na_2O)_{air}}{(Na_2O)_{tin}} - 1.03 \right| \leq 1.2$$

Even more preferably, the float glass sheet has:

$$0.1 < \left| \frac{(Na_2O)_{air}}{(Na_2O)_{tin}} - 1.03 \right| \leq 0.9$$

In a very preferred manner, the float glass sheet has:

$$0.2 < \left| \frac{(Na_2O)_{air}}{(Na_2O)_{tin}} - 1.03 \right| \leq 0.45$$

According to a preferred embodiment of the invention, the float glass sheet has:

$$\frac{(Na_2O)_{air}}{(Na_2O)_{tin}} \leq 1.01.$$

According to this embodiment, preferably, the float glass sheet has:

$$\frac{(Na_2O)_{air}}{(Na_2O)_{tin}} \leq 1.$$

more preferably, the float glass sheet has:

$$\frac{(Na_2O)_{air}}{(Na_2O)_{tin}} \leq 0.99$$

or even $$\frac{(Na_2O)_{air}}{(Na_2O)_{tin}} \leq 0.97.$$

The most preferably, the float glass sheet has:

$$\frac{(Na_2O)_{air}}{(Na_2O)_{tin}} \leq 0.95$$

or even, $$\frac{(Na_2O)_{air}}{(Na_2O)_{tin}} \leq 0.93.$$

Such embodiments are advantageous as they allow decreasing more and more warpage through chemical strengthening and thereby keeping as much as possible flatness of the glass sheet. Some can also lead to negative warpage (or antiwarpage), which is desirable in some applications.

According to the invention, the composition of the float glass sheet is boron-free. This means that boron is not intentionally added in the glass batch/raw materials and that, if it is present, B$_2$O$_3$ content in the composition of the glass sheet reaches only level of an impurity unavoidably included in the production. For example, B$_2$O$_3$ content in the composition of the float glass sheet of the invention is less than 0.01 or even better less than 0.005 wt %.

According to the invention, the composition of the float glass sheet is lithium-free. This means that lithium is not intentionally added in the glass batch/raw materials and that, if it is present, Li$_2$O content in the composition of the glass sheet reaches only level of an impurity unavoidably included in the production. For example, Li$_2$O content in the composition of the float glass sheet of the invention is less than 0.01 wt % or even better less than 0.005 wt %.

According to the invention, the composition of the float glass sheet comprises: $1 \leq Al_2O_3 < 6$ wt %. Preferably, the composition of the float glass sheet comprises: $1 \leq Al_2O_3 < 5$ wt % or even: $1 \leq Al_2O_3 < 4$ wt %. More preferably, the composition of the float glass sheet comprises: $1 \leq Al_2O_3 \leq 3$ wt %. Alternatively, the composition of the float glass sheet comprises: $2 < Al_2O_3 < 6$ wt %. Preferably, the composition of the float glass sheet comprises: $2 < Al_2O_3 < 5$ wt % or even: $2 < Al_2O_3 < 4$ wt %. More preferably, the composition of the float glass sheet comprises: $2 < Al_2O_3 \leq 3$ wt %. Advantageously and alternatively also, $3 \leq Al_2O_3 < 6$ wt %. Preferably, the composition of the float glass sheet comprises: $3 \leq Al_2O_3 < 5$ wt % or even: $3 \leq Al_2O_3 < 4$ wt %.

More preferably, the composition of the float glass sheet comprises: $4 \leq Al_2O_3 < 6$ wt % or even $4 \leq Al_2O_3 < 5$ wt %.

According to the invention, the composition of the float glass sheet comprises: $0 \leq CaO < 4.5$ wt %. Preferably, the composition of the float glass sheet comprises: $0 \leq CaO < 4$ wt % and more preferably, $0 \leq CaO < 3.5$ wt %. In a very particularly preferred embodiment, the composition of the float glass sheet comprises: $0 \leq CaO < 3$ wt %, or even better $0 \leq CaO < 2$ wt %. In the most preferred embodiment, the composition of the float glass sheet comprises: $0 < CaO < 1$ wt %.

According to the invention, the composition of the float glass sheet comprises: $4 \leq MgO \leq 12$ wt %. Preferably, the composition of the float glass sheet comprises: $5.5 \leq MgO \leq 10$ wt % and more preferably, $6 \leq MgO \leq 10$ wt %.

According to the invention, the composition of the float glass sheet comprises: $0 \leq K_2O < 5$ wt %. Preferably, the composition of the float glass sheet comprises: $0 \leq K_2O < 4$ wt % and more preferably, $0 \leq K_2O < 3$ wt %, even better $0 \leq K_2O < 2$ wt %. In the most preferred embodiment, the composition of the float glass sheet comprises: $1 \leq K_2O < 2$ wt %

According to an embodiment, the composition of the float glass sheet comprises the following: $0.5 \leq [MgO/(MgO+CaO)] < 1$. Preferably, the composition of the float glass sheet comprises the following: $0.6 \leq [MgO/(MgO+CaO)] < 1$. More preferably, the composition of the float glass sheet comprises the following: $0.75 \leq [MgO/(MgO+CaO)] < 1$. Alternatively, the composition of the float glass sheet comprises the following: $0.5 \leq [MgO/(MgO+CaO)] < 0.95$, or even more better $0.5 \leq [MgO/(MgO+CaO)] < 0.85$. More preferably, the composition of the float glass sheet comprises the following: $0.75 \leq [MgO/(MgO+CaO)] < 0.85$.

According to a very preferred embodiment, the composition of the float glass sheet comprises the following: $0.88 \leq [MgO/(MgO+CaO)] < 1$. Preferably, the composition of the float glass sheet comprises the following: $0.9 \leq [MgO/(MgO+CaO)] < 1$. More preferably, the composition of the float glass sheet comprises the following: $0.9 < [MgO/(MgO+CaO)] \leq 0.95$. Alternatively, the composition of the float glass sheet comprises the following: $0.88 \leq [MgO/(MgO+CaO)] \leq 0.98$. More preferably, the composition of the float glass sheet comprises the following: $0.90 \leq [MgO/(MgO+CaO)] \leq 0.98$ or even better, $0.92 \leq [MgO/(MgO+CaO)] \leq 0.98$, or even more better $0.92 \leq [MgO/(MgO+CaO)] \leq 0.95$.

According to an embodiment of the invention, the composition comprises total iron (expressed in the form of $Fe_2O_3$) in a content ranging from 0.002 to 1.7% by weight. Preferably, the composition of the invention comprises a total iron (expressed in terms of $Fe_2O_3$) content ranging from 0.002 to 0.6 wt % and, more preferably, ranging from 0.002 to 0.2 wt %.

In a very preferred embodiment, the composition of the invention comprises a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no color variation when white silk printing of some glass elements of smartphones). The minimum value makes it possible not to be excessively damaging to the cost of the glass as such, low iron values often require expensive, very pure, raw materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

According to a particularly preferred embodiment, the composition of the float glass sheet of the invention comprises the following in weight percentage, expressed with respect to the total weight of glass:

$65 \leq SiO_2 \leq 78\%$
$10 \leq Na_2O \leq 20\%$
$0 \leq K_2O < 4\%$
$2 < Al_2O_3 \leq 3\%$
$0 < CaO < 3.5\%$
$4 \leq MgO \leq 12\%$
$0.5 \leq [MgO/(MgO+CaO)] < 1$ According to this last embodiment, the composition of the float glass sheet of the invention more preferably comprises:

$65 \leq SiO_2 \leq 78\%$
$10 \leq Na_2O \leq 20\%$
$0 \leq K_2O < 3\%$
$2 < Al_2O_3 \leq 3\%$
$0 < CaO < 3.5\%$
$6 \leq MgO \leq 10\%$
$0.75 \leq [MgO/(MgO+CaO)] < 1$ According to another preferred embodiment, the composition of the float glass sheet of the invention more preferably comprises:

$65 \leq SiO_2 \leq 78\%$
$10 \leq Na_2O \leq 20\%$
$0 \leq K_2O < 3\%$
$4 \leq Al_2O_3 < 5\%$
$0 < CaO < 3.5\%$
$6 \leq MgO \leq 10\%$
$0.88 \leq [MgO/(MgO+CaO)] < 1$ According to another embodiment, the composition of the float glass sheet comprises ZnO in a content lower than 0.1 wt % Preferably, the composition of the glass sheet is free of ZnO. This means that the element zinc is not intentionally added in the glass batch/raw materials and that, if it is present, ZnO content in the composition of the glass sheet reaches only level of an impurity unavoidably included in the production.

According to another embodiment, the composition of the float glass sheet comprises $ZrO_2$ in a content lower than 0.1 wt %. Preferably, the composition of the glass sheet is free of $ZrO_2$. This means that the element zirconium is not intentionally added in the glass batch/raw materials and that, if it is present, $ZrO_2$ content in the composition of the glass sheet reaches only level of an impurity unavoidably included in the production.

According to still another embodiment, the composition of the float glass sheet comprises BaO in a content lower than 0.1 wt %. Preferably, the composition of the glass sheet is free of BaO. This means that the element barium is not intentionally added in the glass batch/raw materials and that, if it is present, BaO content in the composition of the glass sheet reaches only level of an impurity unavoidably included in the production.

According to still another embodiment, the composition of the float glass sheet comprises SrO in a content lower than 0.1 wt %. Preferably, the composition of the glass sheet is free of SrO. This means that the element strontium is not intentionally added in the glass batch/raw materials and that, if it is present, SrO content in the composition of the glass sheet reaches only level of an impurity unavoidably included in the production.

According to still another embodiment, the composition of the float glass sheet comprises bulk $SnO_2$ in a content lower than 0.1 wt % (bulk content excluding $SnO_2$ in the "tin face" of a float glass sheet). Preferably, the composition of the glass sheet is free of bulk $SnO_2$. This means that the element tin is not intentionally added in the glass batch/raw materials and that, if it is present, bulk $SnO_2$ content in the composition of the glass sheet reaches only level of an impurity unavoidably included in the production.

According to an embodiment of the invention, the composition comprises coloring components other than iron, chromium and cobalt oxides in a total content which is less than 0.005 wt %. Such an embodiment allows to control color and thus to provide a glass sheet which is neutral as mainly requested for display applications. More preferably, the composition of the invention comprises coloring components other than iron, chromium and cobalt oxides in a total content which is less than 0.003 wt %.

Advantageously, the composition of the invention may further comprise chromium and/or cobalt oxides in a total content which is between 0.001 and 0.025 wt %. This means that the composition may comprise only chromium, only cobalt or both. Such a specific composition makes the glass especially suitable for touch technology based on IR transmission.

According to one embodiment of the invention, the float glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the float glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the float glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the float glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to the applications and/or properties desired, other layer(s)/treatment(s) can be deposited/done on one and/or the other face of the float glass sheet according to the invention.

The glass sheet of the invention is obtained by a float method. In the float method, a glass sheet is manufactured using a melting furnace in which a raw material of glass is melted, a float bath in which molten glass is floated on a molten metal (tin) to form a glass ribbon, and an annealing furnace in which the glass ribbon is annealed. Hereinafter, in the method description, the term "glass sheet" may be used as a generic term indicating the glass sheet and/or the glass ribbon.

In an exemplified method of preparing the float glass sheet of the invention, at least the air face of the glass sheet (or glass ribbon) is subjected to a dealkalization treatment, thereby removing alkaline components, and thus, reaching the specific ratio according to the invention. For example, the dealkalization method may advantageously be a method of treating the glass with a substance capable of ion exchange reaction(s) with alkaline components in the glass. As a substance capable of ion exchange reaction(s) with alkaline components in the glass, examples include molecules having fluorine atoms in the structure thereof, sulphur-based compounds, acid, or nitride. The substance capable of ion exchange reaction(s) with alkaline components in the glass may be for example in the form of gas, liquid, . . . or any other suitable form (available form(s) depend(s) amongst others of the substance itself).

Examples of substance containing molecules having fluorine atoms in the structure thereof include hydrogen fluoride (HF), freon (for example, chlorofluorocarbon, fluorocarbon, hydrochlorofluorocarbon, hydrofluorocarbon, halon and the like), hydrofluoric acid, fluorine (simple substance), trifluoroacetic acid, carbon tetrafluoride, silicon tetrafluoride, phosphorus pentafluoride, phosphorus trifluoride, boron trifluoride, nitrogen trifluoride, chlorine trifluoride, and the like.

Examples of sulphur-based compounds include sulfurous acid, sulfuric acid, peroxomonosulfuric acid, thiosulfuric acid, dithionous acid, disulfuric acid, peroxodisulfuric acid, polythionic acid, hydrogen sulfide, sulfur dioxide, and the like.

Examples of an acid include hydrochloric acid, carbonic acid, boric acid, lactic acid, and the like.

Examples of a nitride include nitric acid, nitric monoxide, nitrogen dioxide, nitrous oxide, and the like.

The method for application of the substance capable of ion exchange reaction(s) with alkaline components in the glass may be chosen depending on the form of the substance and any other suitable and desired parameter.

In the float process in which glass is formed on a molten metal (tin) bath, the substance capable of ion exchange reaction(s) with alkaline components in the glass may be supplied to the glass sheet being conveyed on the molten metal bath from the side not in contact with the metal surface, thereby treating the top face of the glass sheet/ribbon (air face). In the annealing zone subsequent to the molten metal (tin) bath, the glass sheet is conveyed by roller conveying. Here, the annealing zone includes not only the inside of the annealing furnace but also a portion where the glass sheet is conveyed from the molten metal bath to the annealing furnace in the float bath. In the annealing zone, the substance capable of ion exchange reaction(s) with alkaline components in the glass may be supplied from the face that was not in contact with the molten metal (air face) and/or the opposite face (tin face).

The invention also relates to the use of the chemically tempered float glass sheet according to the invention in an electronic device.

EXAMPLES

Powder raw materials were mixed together and placed in melting crucibles, according the compositions specified in Table 1. The raw material mix was then heated up in an electrical furnace to a temperature allowing complete melting of the raw material.

After the melting and the homogenization of the composition, the glass was cast in several small samples of 40*40 mm and annealed in an annealing furnace. Subsequently, the samples were polished up to a surface state similar to floated glass (mirror polishing). Several samples were produced for each composition.

Composition of comparative example 1 corresponds to a classical low-iron soda-lime (SL) glass according to the state of the art and composition of comparative example 2 corresponds to a commercially available alumino-silicate (AS) glass.

Compositions of examples 1-10 correspond to compositions according to the invention.

Two glass samples from each composition from examples were then treated with a dealkalization substance: samples were pre-heated at 200° C. inside an electric furnace. They were then heated-up in another electrical furnace up to 450° C. The heating-up step took 40 min. A thermocouple placed inside the furnace allowed checking the temperature of the sample before and after the dealkalinization treatment.

TABLE 1

| Wt % | Comp. ex. 1 (SL) | Comp. ex. 2 (AS) | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| $SiO_2$ | 72 | 60.9 | 72.1 | 71.3 | 70.6 | 70.2 | 68.4 | 69.4 | 70.5 | 74.0 | 73.9 | 73.1 |
| $Al_2O_3$ | 1.3 | 12.8 | 2.0 | 2.3 | 3.0 | 2.9 | 4.9 | 3.8 | 3.1 | 1.1 | 1.2 | 1.1 |
| MgO | 4.5 | 6.7 | 7.5 | 6.7 | 9.1 | 9.2 | 8.8 | 8.3 | 7.2 | 8.9 | 8.9 | 6.9 |
| CaO | 7.9 | 0.1 | 3.0 | 4.3 | 0.6 | 0.6 | 1.0 | 1.1 | 3.4 | 0.3 | 0.4 | 3.6 |
| $Na_2O$ | 13.9 | 12.2 | 15.0 | 13.6 | 16.3 | 15.2 | 16.5 | 16.0 | 13.8 | 15.3 | 15.3 | 14.9 |
| $K_2O$ | 0 | 5.9 | 0 | 1.4 | 0 | 1.2 | 0.02 | 0.95 | 1.7 | 0.2 | 0.2 | 0.2 |
| $Fe_2O_3$ | 0.01 | 0 | 0.01 | 0.01 | 0.01 | 0.01 | 0.01 | 0.01 | 0.09 | 0.09 | 1.10 | 1.10 |
| BaO | 0 | 0.2 | 0 | 0 | 0 | 0 | 0 | 0 | 0 | 0 | 0 | 0 |
| $SO_3$ | 0.36 | 0 | 0.36 | 0.36 | 0.36 | 0.36 | 0.36 | 0.36 | 0.36 | 0.36 | 0.36 | 0.36 |
| SrO | 0 | 0.2 | 0 | 0 | 0 | 0 | 0 | 0 | 0 | 0 | 0 | 0 |
| $ZrO_2$ | 0 | 1.0 | 0 | 0 | 0 | 0 | 0 | 0 | 0 | 0 | 0 | 0 |

Figure 2:
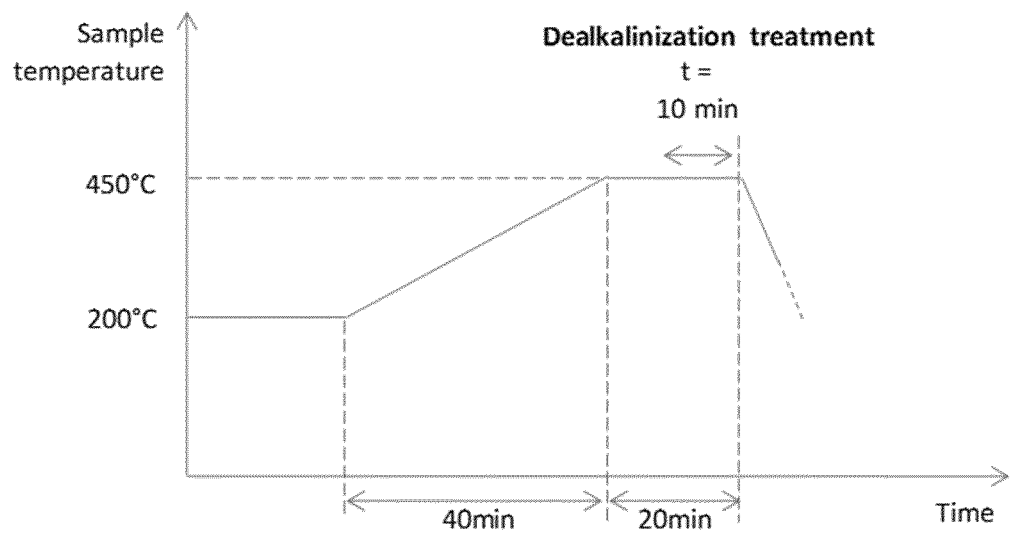

In order to insure the same thermal history for all samples, the samples were maintained at 450° C. during 20 minutes. The dealkalization treatment consisted in injecting $SO_2$ (10% $SO_2$+90% dried air) at 20 l/h with humidified air at 2 l/h (bubbling of dried air inside demi-water at 25° C.) selectively on a glass face 1 (then called the "treated face 1") for a given time (t=0 (reference), 3, 10, 17 or 20 minutes), leading to different levels of soda depletion. The dealkalization step is done so that this step happens during but at the end of the maintain at 450° C. (see for example, FIG. 2 for temperature profile for 10 minutes of dealkalization treatment), in order to avoid any relaxation effect and retro diffusion of soda from the bulk towards the surface.

The samples were then removed from the heating furnace, washed and analyzed: one sample was used for XRF measurements of composition of the glass bulk and $Na_2O$ amount on the treated glass face 1; the other one has undergone chemical tempering.

Chemical Tempering

Chemical tempering #1: Some samples prepared in above section were chemically tempered at the same time and in the same conditions. The samples of different compositions were placed in a cassette, preheated and then dipped in a molten $KNO_3$ (>99%) bath at 420° C. for 220 minutes.

Chemical tempering #2: Some samples prepared in above section were chemically tempered at the same time and in the same conditions. The samples of different compositions were placed in a cassette, preheated and then dipped in a molten $KNO_3$ (>99%) bath at 430° C. for 240 minutes.

After the ion exchange, the samples were cooled down and washed. Subsequently the surface compressive stress (CS) and the depth of exchanged layer (DoL) were measured via photoelasticimetry.

Table 2 summarizes, for chemical tempering #1, the average value of CS and DoL from treated face 1, for random samples of each of examples 1-4 and 7-10 according to the invention and Comparative examples 1-2.

TABLE 2

| chemical tempering #1 | Comp. ex. 1 (SL) | Comp. ex. 2 (AS) | Ex. 1 | Ex. 2 | Ex. 3 | Ex. 4 | Ex. 7 | Ex. 8 | Ex. 9 | Ex. 10 |
|---|---|---|---|---|---|---|---|---|---|---|
| Surface compressive stress (MPa) | 861 | 884 | 785 | 803 | 820 | 818 | 808 | 645 | 646 | 693 |
| Depth of exchanged layer (μm) | 6.7 | 36.1 | 13.3 | 11.5 | 16.6 | 18.1 | 13.9 | 20.3 | 18.6 | 12.6 |

Those results show that combining, in a soda-silica glass matrix, a low alumina and CaO content as well as a (MgO/(MgO+CaO)) ratio which is higher than 0.5 allows to significantly improve the depth of exchanged layer, while keeping a high surface compressive stress and thus, to increase the glass reinforcement.

Moreover, DOL values of compositions according to the invention are well appropriate for a "piece-by-piece" process used to produce cover glass for display devices (preferably higher than 10 microns and very preferably higher than 12 microns or even better higher than 15 microns).

Table 3 summarizes, for chemical tempering #2 and for the treated face 1, Na$_2$O amount as well as the average value of CS and DoL for random samples of examples 5-6 according to the invention and comparative example 1, depending on the duration of dealkalization treatment. Table 3 also shows the same values/parameters obtained for the other face 2 (non-treated by a dealkalization treatment), as such (case 1) or alternatively, while simulating a "tin face" coming from a float process (case 2).

Firstly, one can observe that the dealkalization treatment (treated face 1) allows to tune the chemical tempering performance of the treated face, enabling a controlled warpage. The dealkalinization treatment decreases a little bit CS but while keeping high performances on the DOL. Nevertheless, the CS levels obtained even with the dealkalization treatment with composition of the invention remains globally higher than the soda-lime reference (comparative example 1).

Next to that, as a result of CS modification due to the dealkalinization treatment, the mechanical constraints induced by the chemical tempering on the treated face 1 will evolve comparing to the other face 2. While evolving, one could play on this equilibrium of mechanical constraints in order to obtain the desired warpage or suppress it. This is illustrated in Table 3 by evaluation of the mechanical constraints and induced warpage on examples 5-6 and comparative example 1. The warpage was computed mainly based on CS, DOL and sample geometrical, dimensions for a square glass sheet (0.7 mm thickness, 4×4 cm), as being the elevation of the middle of the side versus the centre of the sample while convex face is down (d/L, see FIG. 1). A

TABLE 3

| chemical tempering #2 | Comp. ex. 1 (SL) | | | | Ex. 5 | | | | Ex. 6 | | | |
|---|---|---|---|---|---|---|---|---|---|---|---|---|
| Dealk. duration (min) | 0 | 3 | 10 | 20 | 0 | 3 | 10 | 20 | 0 | 3 | 10 | 20 |
| | | | | | Treated face 1 | | | | | | | |
| Na$_2$O on treated face (%) | 13.54 | 12.97 | 12.74 | 12.51 | 16.24 | 15.66 | 14.70 | 14.46 | 15.49 | 15.38 | 13.51 | 14.07 |
| Surface compressive stress (MPa) | 662 | 617 | 578 | 592 | 785 | 771 | 730 | 715 | 695 | 714 | 637 | 678 |
| Depth of exchanged layer (μm) | 11.9 | 11.8 | 11.6 | 11.7 | 25.4 | 25.3 | 25.6 | 25.8 | 30.9 | 29.5 | 30.0 | 29.4 |
| | | | | | Case 1: Non-treated face 2 | | | | | | | |
| Surface compressive stress (MPa) | 662 | 662 | 662 | 662 | 785 | 785 | 785 | 785 | 695 | 695 | 695 | 695 |
| Depth of exchanged layer (μm) | 11.9 | 11.9 | 11.9 | 11.9 | 25.4 | 25.4 | 25.4 | 25.4 | 30.9 | 30.9 | 30.9 | 30.9 |
| Computed warpage (%) | 0.000 | −0.019 | −0.038 | −0.031 | 0.000 | −0.014 | −0.041 | −0.049 | 0.000 | −0.010 | −0.074 | −0.046 |
| | | | | | Case 2: Non-treated face 2 with float simulation (tin face) | | | | | | | |
| Na$_2$O on non-treated face (%) | 13.1 | 13.1 | 13.1 | 13.1 | 15.8 | 15.8 | 15.8 | 15.8 | 15.0 | 15.0 | 15.0 | 15.0 |
| $\left\|\frac{(Na_2O)_{air}}{(Na_2O)_{tin}} - 1.03\right\|$ | 0 | −0.04 | −0.06 | −0.08 | 0.00 | −0.04 | −0.10 | −0.11 | 0 | −0.01 | −0.13 | −0.09 |
| Surface compressive stress (MPa) | 722 | 722 | 722 | 722 | 856 | 856 | 856 | 856 | 758 | 758 | 758 | 758 |
| Depth of exchanged layer (μm) | 10 | 10 | 10 | 10 | 21 | 21 | 21 | 21 | 26 | 26 | 26 | 26 |
| Computed warpage (%) | 0.022 | 0.003 | −0.016 | −0.009 | 0.050 | 0.036 | 0.009 | 0.001 | 0.051 | 0.041 | −0.023 | 0.005 | negative value of warpage means that treated face is concave, while a positive value means that the treated face is convex.

Case 1 in table 3 shows the evolution of the warpage when face 1 is treated by a dealkalization and face 2 is as such (untreated). Such a case mimics an industrial case in which the glass sheet is produced by the float process but wherein the "tin face" has been polished (face 2) and the "air face" has been treated by a dealkalization treatment (face 1), prior to tempering. One can observe the variation of the warpage while applying different time of dealkalinization treatment, thereby modifying the $Na_2O$ available content, on the treated face 1 versus the non-treated face 2.

Case 2 in table 3 shows the evolution of the warpage when face 1 is treated by a dealkalization and face 2 is untreated but corresponds to a simulated "tin face" coming from a float process. Such a case mimics an industrial case in which the glass sheet is produced by the float process (face 2 is "tin face") and the "air face" has been treated by a dealkalization treatment (face 1), prior to tempering. In reference conditions, the ratio $Na_2O$ air/tin is 1.03. Also, the CS level is classically 9% higher on tin face than on air face and DOL is 17% lower on tin face than on air face. This allows for each composition kind to establish a reference tin face. From the results, one can clearly observe the presence of a significant warpage for examples 5-6 and comparative example 1 while no warpage treatment is applied (duration=0). Next, one can also observe that the initial warpage can be controlled/modified/suppressed by controlling the amount of $Na_2O$ in the air face versus in the tin face, in the range claimed.

Other Properties

The following properties were evaluated on the basis of glass composition using Fluegel model (*Glass Technol.: Europ. J. Glass Sci. Technol.* A 48 (1): 13-30 (2007); and *Journal of the American Ceramic Society* 90 (8): 2622 (2007)) for compositions of examples 1-4 according to the invention as well as of Comparative examples 1-2:
  Glass melt density evaluated at 1200 and 1400° C.;
  Viscosity through the "Melting point temperature T2";
  "Working point temperature T4";
  Devitrification temperature T0;
  Coefficient of thermal expansion (CET);

Moreover, refractories corrosion behaviour was evaluated according to the known "Dunkl corrosion test" (during 36 h at 1550° C.), given in percentage corresponding to the loss of material at the metal line.

In a general manner:

The melting point temperature T2 is preferably at most 1550° C., more preferably at most 1520° C., the most preferably at most 1500° C.

The Working point temperature T4 is preferably at most 1130° C., more preferably at most 1100° C., the most preferably at most 1070° C.

The devitrification temperature T0 is preferably at most T4, more preferably at most T4-20° C., the most preferably at most T4-40° C.

The loss of material at the metal line during corrosion test is preferably less than 13%, more preferably less than 11%, the most preferably less than 9%.

CET value (in $10^{-6}/K$) is preferably at most 9.6 and more preferably at most 9.4.

Table 4 summarizes these properties for examples 1-4 and 7-10 according to the invention and Comparative examples 1-2.

The compositions according to present invention are suitable for forming by a float process and while using existing furnace tools for production of soda lime glass because of:
  their melting point temperature T2 being lower than 1500° C. and which are comparable to a classical soda lime glass (Comparative ex. 1) and significantly lower compared to an aluminosilicate glass (Comparative ex. 2);
  their working point temperature T4 which is lower than 1100° C. and which are comparable to a classical soda lime glass (Comparative ex. 1) and lower compared to an aluminosilicate glass (Comparative ex. 2);
  their devitrification temperature T0 are suitable because lower than working point temperature T4;
  their glass density which is very close to soda lime and aluminosilicate glasses (Comparative ex. 1-2), thereby avoiding/limiting density defects during composition change (transition);
  their good results in term of refractory corrosion, better than a classical soda lime glass (Comparative ex. 1).

Moreover, the compositions according to present invention have coefficients of thermal expansion (CET) which reach in a known manner appropriate values for a subsequent chemical tempering (limiting differentiated cooling deformation phenomenon). More specifically, the compositions according to present invention show better (lower) values for CET than aluminosilicate glass and thus are less sensitive to differentiated cooling issues than AS glass.

TABLE 4

|  |  | Comp ex. 1 (SL) | Comp ex. 2 (AS) | Ex. 1 | Ex. 2 | Ex. 3 | Ex. 4 | Ex. 7 | Ex. 8 | Ex. 9 | Ex. 10 |
|---|---|---|---|---|---|---|---|---|---|---|---|
| Glass melt density | at 1200° C. | 2.37 | 2.32 | 2.34 | 2.35 | 2.33 | 2.33 | 2.35 | 2.33 | 2.33 | 2.34 |
|  | at 1400° C. | 2.34 | 2.32 | 2.32 | 2.33 | 2.32 | 2.32 | 2.33 | 2.31 | 2.31 | 2.32 |
| Melting point T2 (° C.) |  | 1463 | 1601 | 1484 | 1492 | 1485 | 1493 | 1499 | 1485 | 1487 | 1478 |
| Working point T4 (° C.) |  | 1037 | 1176 | 1050 | 1055 | 1048 | 1053 | 1058 | 1047 | 1050 | 1044 |
| Devitrification temperature T0 (° C.) |  | 994 | 951 | 958 | 968 | 989 | 1028 | 986 | 989 | 990 | 932 |
| CET @210° C. ($10^{-6}/K$) |  | 9.15 | 9.68 | 9.07 | 9.17 | 9.33 | 9.37 | 9.23 | 8.90 | 8.93 | 9.10 |
| Dunkl test 36 h/1550° C. (%) |  | 12.10 | — | 7.69 | 5.53 | — | 5.29 | — | — | — | — |

Finally, compositions according to the invention allow to get sulfate fining ability during their manufacture/melting, thanks to an adequate solubility of sulfate and suitable high-temperature viscosity.

The invention claimed is:

1. A float glass sheet having a boron- and lithium-free glass composition comprising the following in weight percentage, expressed with respect to the total weight of glass:
65≤$SiO_2$ ≤78%;
5≤$Na_2O$≤20;
0≤$K_2O$<5%;
1≤$Al_2O_3$ <6%;
0≤CaO<4.5%;
4≤MgO≤12%, and
having a (MgO/(MgO+CaO)) ratio≥0.5
wherein the glass sheet has:

$$0.01 < \left|\frac{(Na_2O)_{air}}{(Na_2O)_{tin}} - 1.03\right| \le 3.$$

2. A float glass sheet according to claim 1, wherein the composition comprises total iron (expressed in the form of $Fe_2O_3$) in a content ranging from 0.002 to 1.7% by weight.

3. A float glass sheet according to claim 1, wherein the composition comprises total iron (expressed in the form of $Fe_2O_3$) in a content ranging from 0.002 to 0.06% by weight.

4. A float glass sheet according to claim 1, wherein the composition comprises total iron (expressed in the form of $Fe_2O_3$) in a content ranging from 0.002 to 0.02% by weight.

5. A float glass sheet according to claim 1, wherein the composition comprises: 1≤$Al_2O_3$<5 wt %.

6. A float glass sheet according to claim 1, wherein the composition comprises: 1≤$Al_2O_3$<4 wt %.

7. A float glass sheet according to claim 1, wherein the composition comprises: 1≤$Al_2O_3$<3 wt %.

8. A float glass sheet according to claim 1, wherein the composition comprises: 2<$Al_2O_3$<6 wt %.

9. A float glass sheet according to claim 1, wherein the composition comprises: 2<$Al_2O_3$<4 wt %.

10. A float glass sheet according to claim 1, wherein the composition comprises: 1.0≤CaO<4.5% wt %.

11. A float glass sheet according to claim 1, wherein the composition comprises: 0.5≤[MgO/(MgO+CaO)]<1.

12. A float glass sheet according to claim 1, wherein the composition comprises: 0.75≤[MgO/(MgO+CaO)]<1.

13. A float glass sheet according to claim 1, wherein the composition comprises: 0.88≤[MgO/(MgO+CaO)]<1.

14. A float glass sheet according to claim 1, wherein the glass sheet has:

$$\frac{(Na_2O)_{air}}{(Na_2O)_{tin}} \le 1.$$

15. A float glass sheet according to claim 1, wherein the glass sheet has a thickness of 0.8 mm or less.

16. A float glass sheet according to claim 1, wherein the glass sheet is chemically tempered.

17. A float glass sheet according to claim 1, wherein the float glass sheet has been chemically tempered and has a surface compressive stress of at least 600 MPa and Depth of exchanged layer of at least 15 μm.

18. An electronic device, comprising the float glass sheet of claim 1.

19. A float glass sheet having a boron- and lithium-free glass composition comprising the following in weight percentage, expressed with respect to the total weight of glass:
65≤$SiO_2$≤78%;
5≤$Na_2O$≤20%;
0≤$K_2O$<5%;
1≤$Al_2O_3$<6%;
0.6≤CaO<4.5%;
4≤MgO≤12%, and
having a (MgO/(MgO+CaO)) ratio≥0.5,
wherein the glass sheet has:

$$0.01 < \left|\frac{(Na_2O)_{air}}{(Na_2O)_{tin}} - 1.03\right| \le 3.$$

20. A float glass sheet having a boron- and lithium-free glass composition comprising the following in weight percentage, expressed with respect to the total weight of glass:
65≤$SiO_2$≤78%;
5≤$Na_2O$≤20%;
0≤$K_2O$<2%;
1≤$Al_2O_3$<6%;
0≤CaO<2%;
4≤MgO≤12%; and
having 0.75≤(MgO/(MgO+CaO))≤1,
wherein the glass sheet has:

$$0.01 < \left|\frac{(Na_2O)_{air}}{(Na_2O)_{tin}} - 1.03\right| \le 3.$$

* * * * *